United States Patent [19]

Barrett

[11] Patent Number: 4,896,176
[45] Date of Patent: Jan. 23, 1990

[54] CAMERA FOR MAKING COLLAGE PHOTOGRAPHS

[75] Inventor: Edwin M. Barrett, College Park, Ga.

[73] Assignee: Robert A. Tates, College Park, Ga.; a part interest

[21] Appl. No.: 240,070

[22] Filed: Aug. 26, 1988

[51] Int. Cl.⁴ .............................................. G03B 1/00
[52] U.S. Cl. .................................... 354/122; 354/295
[58] Field of Search ............... 354/107, 108, 110, 115, 354/118, 120, 122, 125, 126, 295, 296, 291; 355/79, 19

[56] References Cited

U.S. PATENT DOCUMENTS

| | | | |
|---|---|---|---|
| D. 276,239 | 11/1984 | Yamamoto | D16/237 |
| 1,418,033 | 5/1922 | Sutcliffe | 354/110 |
| 1,673,019 | 6/1928 | Pomeroy | 354/291 |
| 2,751,826 | 6/1956 | Harrison | 354/295 X |
| 2,922,350 | 1/1960 | Fischer et al. | 354/295 X |
| 3,827,071 | 7/1974 | Turpin | 354/295 X |
| 4,067,026 | 1/1978 | Pappanikolaou | 354/291 X |
| 4,268,144 | 5/1981 | Wheeler | 354/108 |
| 4,484,805 | 11/1984 | Gizzio | 354/122 X |
| 4,707,106 | 11/1987 | Johnson et al. | 354/122 X |
| 4,717,930 | 1/1988 | Wheeler | 354/122 |

Primary Examiner—L. T. Hix
Assistant Examiner—Brian W. Brown
Attorney, Agent, or Firm—Thomas & Kennedy

[57] ABSTRACT

A camera has a lens that has a field of view and a film pack for positioning film for exposure substantially along a focal plane of the lens. A screen is positioned to block a portion of the field of view of the lens. The camera also has a flash unit for illuminating the screen during film exposure whereby light from the field of view may be directed by the lens to one portion of film positioned along the focal plane and light from the screen directed to a second portion of the film.

14 Claims, 2 Drawing Sheets

CAMERA FOR MAKING COLLAGE PHOTOGRAPHS

TECHNICAL FIELD

This invention relates generally to photography and particularly to a camera by which a collage photograph may be made with the image of a subject combined with previously recorded images.

BACKGROUND OF THE INVENTION

It is often desirable to produce a photograph in which the image of a subject is formed together with other, previously recorded images as a unitary collage. Such photographs are useful, for example, to label a scene, to produce lapel buttons and to combine the image of a tourist with images of tourist sites in a single photograph.

In the past collage photographs have been made in photographic laboratories by exposing film to pre-photographed images grouped together. Such post-exposure laboratory processing however does not satisfy the needs for instant photographs where prints are made right after film exposure. Laboratory processing also adds expense even where non-instant type film processing is involved. It is usually more desirable therefore to produce a collage photograph with an instant camera of the type that itself can produce prints.

As a result of the foregoing cameras, particularly instant-type cameras, and camera accessories have recently been developed that are capable of producing collage prints. For example, an instant camera attachment for superimposing graphics such as labels on a photograph is illustrated in U.S. Pat. No. 4,268,144. Here a transparent template bearing opaque letters is positioned over a sheet of photographic film within an instant camera such that images of the letters are recorded along with objects within the camera field of view when a photograph is made. While this device is useful for labeling, it cannot be used to produce a collage photograph wherein various images are isolated on selected portions of the photograph. U.S. Pat. No. 4,717,930 illustrates an extension of this photograph labeling apparatus wherein light from a flash unit is diffused into a tubular area surrounding the camera field of view so that a light modulated background can be added to a photographed scene. While this device can produce a light or colored background for an entire photograph, it too is not capable of producing a collage photograph with separate and distinct images. In U.S. Pat. No. 4,707,106 an auxiliary device is provided for an instant camera for use in holding prerecorded images in various positions so that selected areas of a film strip may be exposed in sequence to form a collage. This however effectively transfers the tedious work that previously had been performed in a film laboratory to the photographer.

SUMMARY OF THE INVENTION

In a preferred form .of the present invention a camera comprises a lens having a field of view and means for positioning film for exposure substantially along a focal plane of the lens. A screen is positioned to block a portion of the field of view. A flash is provided for illuminating the screen during film exposure whereby light from the field of view may be directed by the lens to one portion of film positioned along the focal plane and light from the screen directed to a second portion of the film. By mounting film bearing prerecorded images over the second portion of the film a collage may be created with the prerecorded images separately and distinctly reproduced on the film adjacent the image of objects in the unblocked portion of the field of view.

In another form of the invention a camera has a lens and means for positioning film for exposure to light from a field of view of the lens upon a focal plane. The camera also has a screen positioned to block a portion of the field of view and means for illuminating the screen so that light from the field of view may be focused by the lens on a first portion of the film and light from the screen focused by the lens on a second portion of the film.

DESCRIPTION OF THE PREFERRED EMBODIMENT

Figure 1:
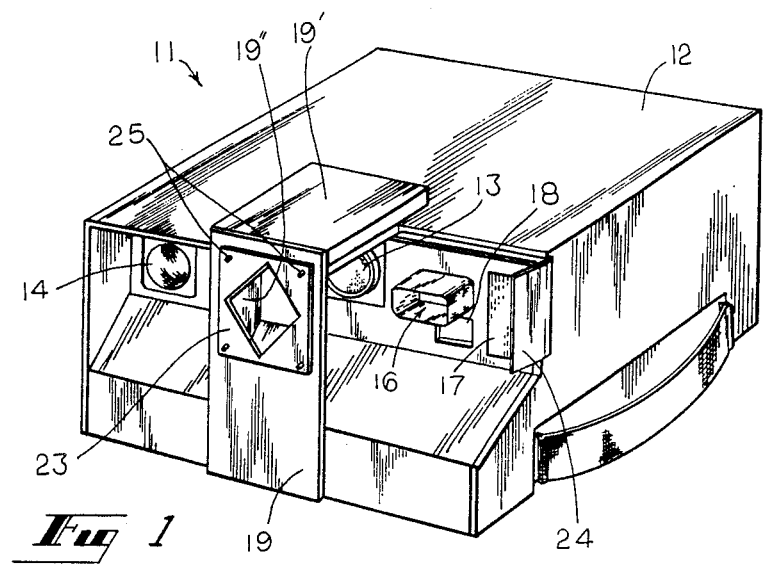
FIG. 1 is a perspective view of a camera constructed in accordance with principles of the invention.
Figure 2:
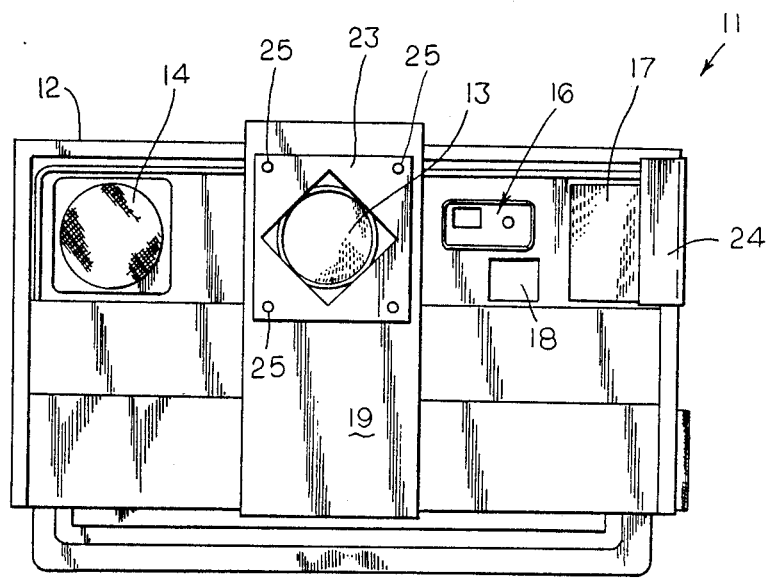
FIG. 2 is a front elevational view of the camera shown in FIG. 1.
Figure 3:
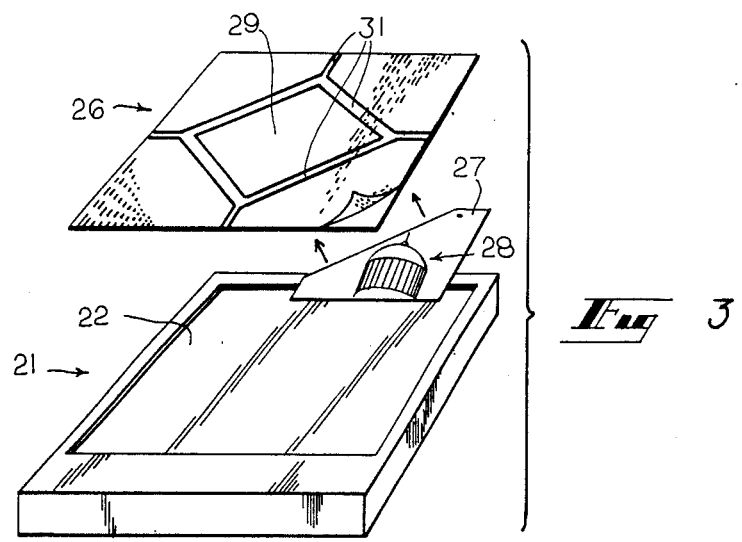
FIG. 3 is an exploded view of a film pack, template and transparency for use with the camera.

Referring now to FIGS. 1–3 of the drawing, there is shown an instant-type camera 11 having a housing 12 formed with an objective aperture in which a lens 13 is mounted. The housing is conventionally configured to receive a film pack 21, which carries a stack of individual frames of film 22 for sequentially positioning photographic film frames along the focal plane of the lens 13 for exposure upon operation of the camera shutter. The camera here is equipped with an automatic focusing unit 14 and with a light meter sensor 16 that serves to adjust the camera shutter speed and objective aperture to provide proper exposure of the film. An electronic flash unit is positioned behind a flash window 17 to illuminate a subject within the camera field of view upon camera operation. A viewfinder 18 is provided to allow a photographer to position a subject within the field of view of the lens. Therefore it is seen that the camera thus far described is of conventionl structure such as the Spectra instant-type cameras sold today by the Polaroid Corporation.

Figure 4:
FIG. 4 is an illustration of a collage photograph produced by the camera using the film pack, template and transparency shown in FIG. 3 and three additional transparencies.

The camera 11 here however is modified to render it capable of making collage photographs, as that illustrated in FIG. 4. The modification includes a screen support member 19 positioned in front of the camera lens 13 which replacably supports an opaque screen 23 on a set of pegs 25 mounted on the front face of the screen support over an opening in the support. Another screen support member 19' extends from the top of the camera housing to the top of member 19 while yet another support member 19" is mounted to their sides. The screen itself is formed with an opening which in this particular case is a diamond-shaped opening that is axially aligned with the camera lens 13. The screen 23 therefore serves to block a peripheral portion of the field of view of the lens such that only subjects in the central portion of that field are focused by the lens onto the film.

A reflector or light baffle 24 is mounted in front of the flash unit so as to overlay obliquely a small side portion of the flash unit window 17 and thereby reflect a portion of light emitted from the flash unit onto the screen support member 19". From there such light is reflected within the box-like enclosure provided by the members 19, 19', 19" and the sloping front ledge of the camera whereby the plain face of the screen 23 facing the lens is illuminated by some of the light from the flash unit. This occurs at the same time that objects in the field of view are illuminated by the flash.

As shown in FIG. 3, a mostly transparent template 26 is provided that is configured to be tucked into the film pack 21 overlying the stack of film frames 22. The template 26 is constructed to receive a set of film transparencies 27 that bear prephotographed or otherwise formed images 28. Specifically, the template is formed of two flexible, transparent sheets that are heat sealed along a double lined diamond and along other double lines that radiate outwardly from the diamond The edges of the template are unsealed to provide four pockets that may individually receive and hold image bearing transparencies 27. Once so loaded the template may be tucked into the film pack 21 so that the loaded template closely overlays the film. The central portion 29 of the template 26, which corresponds in shape to the opening formed in the screen 23, is positioned over the central portion of the film. In this way the transparent central area of the template is registered with the screen opening. Thus, light reflected from the screen 23 may travel through the camera lens 13, through the transparencies, and onto the peripheral portion of the film 22 while light from objects in the unblocked portion of the field of view may be focused by the lens onto the central portion of the film. This results in a collage being simultaneously formed as shown in FIG. 4 with a contact print of the prerecorded images being reproduced on the peripheral portion of the film.

Figure 5:
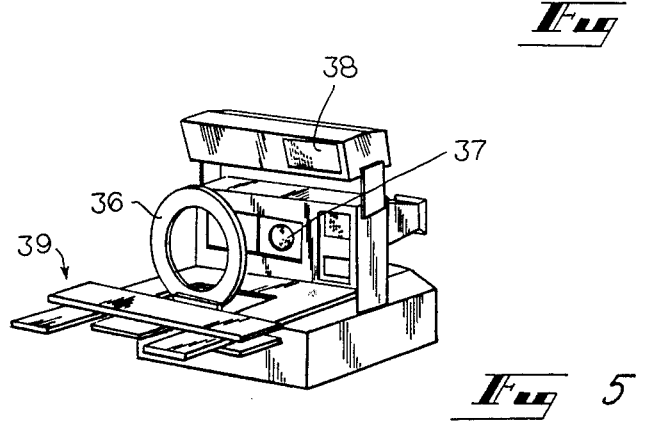
FIG. 5 is a perspective view of another preferred embodiment of the camera invention.

In the FIG. 5 embodiment an annular screen 36 is mounted in front of and in fixed alignment with the camera lens 37. The camera flash 38 is positioned to illuminate a subject directly and also to illuminate the screen directly. Thus, in this embodiment no reflector or light box is employed to direct a portion of the light from the flash unit to the screen. The screen 36 here is mounted uprightly on an x-y translation table 39 so that the area blocked by the screen may be adjusted in both size and location, as desired, for image formation with the use of templates and transparencies of various sizes and shapes. Since the screen here is annular, the template used would likewise have an annular region for holding prerecorded or photographed images.

The invention has been described in terms of preferred embodiments having screens with particular opening shapes and positions. It will be understood that many shapes and positions of openings of the screen, and corresponding template designs, may be provided to produce various results. The screen and template may, for example, be configured to produce an image of the subject on one-half of the photograph while reproducing transparency images on the other half of the photograph. The template may have open areas rather than be completely solid. Further, while the embodiment of FIG. 1 has been described in terms of a camera, it could be conveniently manufactured as an add-on attachment. Though a single flash unit is provided for illuminating both the objects to be photographed and the screen, two units may be employed. Likewise, the lens may be a system of several lenses. And though an instant-type camera is highly preferred, such is not essential. Many other additions, deletions and modifications may also be made to the preferred embodiments without departing from the spirit and scope of the invention as set forth in the following claims.

I claim:
1. A camera comprising:
   a lens having a field of view;
   means for positioning film for exposure substantially along a focal plane of said lens;
   a screen positioned to block a portion of the field of view of said lens; and
   means for illuminating said screen during film exposure whereby light from the field of view may be directed by the lens to one portion of film positioned along the focal plane and light from the screen directed to a second portion of the film.
2. The camera of claim 1 wherein said film positioning means includes means for holding a template in a position closely overlaying said focal plane.
3. The camera of claim 2 wherein said template comprises two substantially transparent sheets adapted to receive and hold in a selected portion thereof at least one image bearing transparency therebetween.
4. The camera of claim 3 wherein said selected portion of said template is located and sized to overlay that portion of said focal plane to which light may be directed from said screen.
5. The camera of claim 1 wherein said illuminating means comprises light flash generating means for simultaneously illuminating said screen and objects within the field of view.
6. The camera of claim 5 and wherein said illuminating means further comprises a light baffle positioned to reflect a portion of light generated by said light flash generating means onto said screen.
7. The camera of claim 1 wherein said illuminating means comprises light flash generating means for directly illuminating a portion of said screen that faces said lens that blocks said lens field of view portion.
8. In a camera of the type having means for positioning film for exposure to light from a field of view of a lens along a focal plane of the lens, the improvement comprising a screen mounted adjacent said lens in position to block a portion of the lens field of view and means for directly illuminating the portion of said screen mounted at said position blocking a portion of the lens field of view whereby light from the field of view may be focused by the lens onto a first portion of film positioned along the focal plane and light from the screen focused by the lens onto a second portion of the film.
9. The improvement in a camera of claim 8 further comprising means for positioning a transparency bearing a prerecorded image between the lens and focal plane in substantial register with the film second portion.
10. The improvement in a camera of claim 8 wherein said illuminating means comprises light flash means for illuminating said screen and that portion of the field of view not blocked by said screen.
11. A camera for making collage photographs by which an image of a subject located within the camera field of view may be recorded with a prerecorded image on one film frame as a collage, and with the camera comprising:
    a lens having a field of view;

means for positioning a film frame substantially along the focal plane of said lens;

means for positioning a transparency bearing the prerecorded image overlaying the film frame;

a screen positioned to block a position of the field of view of said lens; and means for directly illuminating a portion of said screen that blocks said field of view whereby light from the screen may be directed by the lens to one portion of the film and light from that portion of the field of view unblocked by the screen be directed by the lens to a second portion of the film.

12. The camera of claim 11 wherein said screen is positioned to block a peripheral portion of the field of view.

13. The camera of claim 12 wherein said screen consists essentially of a ring mounted coaxially aligned with said lens.

14. The camera of claim 11 wherein said illuminating means comprises a light flash unit having a light exit window, a first light baffle obliquely overlaying a portion of said window, and a second light baffle mounted and oriented to reflect light from said first light baffle onto the side of said screen located proximally to said lens.

* * * * *